(12) United States Patent
Yoakum et al.

(10) Patent No.: US 8,144,633 B2
(45) Date of Patent: Mar. 27, 2012

(54) METHOD AND SYSTEM FOR CONTROLLING AUDIO IN A COLLABORATION ENVIRONMENT

(75) Inventors: John H. Yoakum, Cary, NC (US); Tony McCormack, Galway (IE); John Costello, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 264 days.

(21) Appl. No.: 12/564,262

(22) Filed: Sep. 22, 2009

(65) Prior Publication Data

US 2011/0069643 A1    Mar. 24, 2011

(51) Int. Cl.
    *H04L 12/16* (2006.01)
(52) U.S. Cl. .................. 370/261; 348/14.03; 348/14.05; 348/14.08
(58) Field of Classification Search ............. 379/142.01; 381/92, 122, 369; 348/14.05, 14.03, 14.08; 370/261
See application file for complete search history.

(56) References Cited

U.S. PATENT DOCUMENTS

| | | | |
|---|---|---|---|
| 4,650,929 A | 3/1987 | Boerger et al. |
| 4,734,934 A | 3/1988 | Boggs et al. |
| 5,020,098 A | 5/1991 | Celli |
| 5,113,431 A | 5/1992 | Horn |
| 5,533,112 A | 7/1996 | Danneels |
| 5,539,741 A | 7/1996 | Barraclough et al. |
| 5,889,843 A | 3/1999 | Singer et al. |
| 6,125,115 A | 9/2000 | Smits |
| 6,178,237 B1 | 1/2001 | Horn |
| 6,219,045 B1 | 4/2001 | Leahy et al. |
| 6,241,612 B1 | 6/2001 | Heredia |
| 6,327,567 B1 | 12/2001 | Willehadson et al. |
| 6,330,022 B1 | 12/2001 | Seligmann |
| 6,408,327 B1 | 6/2002 | McClennon et al. |
| 6,501,739 B1 | 12/2002 | Cohen |
| 6,539,087 B1 | 3/2003 | Walsh et al. |

(Continued)

FOREIGN PATENT DOCUMENTS

EP    0762717 A2    3/1997

(Continued)

OTHER PUBLICATIONS

Benford, S., et al., "Managing Mutual Awareness in Collaborative Virtual Environments," Proceedings VRST '94, Aug. 1994, ACM Press, Singapore, 14 pages.

(Continued)

*Primary Examiner* — Dang Ton
*Assistant Examiner* — Mohamed Kamara
(74) *Attorney, Agent, or Firm* — Withrow & Terranova, PLLC

(57) ABSTRACT

A method and system for designating an aural position of an audio stream in a collaboration environment. A plurality of icons corresponding to participants are displayed in a user interface. A moderator may move the icons from a first position in the user interface to a second position in the user interface. Upon moving an icon from a first position to a second position, an aural position identifier corresponding to the second position is generated and sent to a conference processor. The conference processor uses the aural position identifier to generate an outgoing audio stream that aurally positions the audio stream generated by the participant corresponding to the icon at the aural position. The outgoing audio stream is provided to the moderator, who uses a multi-channel capable device to perceive the audio stream at the designated aural position.

22 Claims, 9 Drawing Sheets

U.S. PATENT DOCUMENTS

| | | | |
|---|---|---|---|
| 6,559,863 B1 | 5/2003 | Megiddo | |
| 6,657,975 B1 | 12/2003 | Baxley et al. | |
| 6,675,054 B1 | 1/2004 | Ruberg | |
| 6,807,563 B1 | 10/2004 | Christofferson et al. | |
| 6,813,360 B2 | 11/2004 | Gentle | |
| 6,839,417 B2 | 1/2005 | Weisman et al. | |
| 6,850,496 B1 | 2/2005 | Knappe et al. | |
| 6,879,565 B2 | 4/2005 | Baxley et al. | |
| 6,985,571 B2 | 1/2006 | O'Malley et al. | |
| 7,006,616 B1 | 2/2006 | Christofferson et al. | |
| 7,111,049 B1 | 9/2006 | Granger et al. | |
| 7,181,690 B1 | 2/2007 | Leahy et al. | |
| 7,194,084 B2 | 3/2007 | Shaffer et al. | |
| 2002/0013813 A1 | 1/2002 | Matsuoka | |
| 2003/0021400 A1 | 1/2003 | Grandgent et al. | |
| 2003/0112947 A1 | 6/2003 | Cohen | |
| 2003/0117531 A1 | 6/2003 | Rovner et al. | |
| 2003/0174657 A1 | 9/2003 | Qin | |
| 2003/0234859 A1* | 12/2003 | Malzbender et al. | 348/14.05 |
| 2004/0013252 A1 | 1/2004 | Craner | |
| 2004/0047461 A1 | 3/2004 | Weisman et al. | |
| 2004/0101120 A1 | 5/2004 | O'Malley et al. | |
| 2004/0240652 A1 | 12/2004 | Kanada | |
| 2005/0062843 A1 | 3/2005 | Bowers et al. | |
| 2005/0181872 A1 | 8/2005 | Acharya et al. | |
| 2005/0271194 A1 | 12/2005 | Woods et al. | |
| 2005/0280701 A1* | 12/2005 | Wardell | 348/14.08 |
| 2006/0067500 A1 | 3/2006 | Christofferson et al. | |
| 2006/0104458 A1 | 5/2006 | Kenoyer et al. | |
| 2007/0071204 A1 | 3/2007 | Kanada | |
| 2007/0133436 A1 | 6/2007 | Provino et al. | |
| 2007/0279484 A1 | 12/2007 | Derocher et al. | |
| 2008/0144794 A1 | 6/2008 | Gardner | |
| 2008/0144876 A1* | 6/2008 | Reining et al. | 381/369 |
| 2008/0260131 A1 | 10/2008 | Akesson | |
| 2010/0020951 A1* | 1/2010 | Basart et al. | 379/142.01 |
| 2010/0073454 A1* | 3/2010 | Lovhaugen et al. | 348/14.03 |

FOREIGN PATENT DOCUMENTS

WO     9941880 A1     8/1999

OTHER PUBLICATIONS

Damer, B., "Avatars!: Exploring and Building Virtual Worlds on the Internet (excerpts)", Peachpit Press, Berkeley, 1998, 158 pages.

No Author, "Digital Space Traveler User Guide," The Digital Space Commons, Chapters 1-8, http://www.digitalspace.com/traveler/DigitalSpaceTravelerUserGuide.pdf, 46 pages.

McCarthy, S., "PC users step through their screens via OnLive,!" Telephony Online, Sep. 9, 1996, accessed May 27, 2007, http://telephonyonline.com/mag/telecom_pc_users_step/, 2 pages.

No Author, "OnLive! Products," OnLive! Technologies, Inc., accessed May 22, 2007, http://web.archive.org/web/19970714193742/http://www.onlive.com/prod/, 3 pages.

Liesenborgs, J., "Voice over IP in networked virtual environments," Maastricht University Doctoral Thesis, 1999-2000 Academic Year, Title Page, Table of Contents and Chapters 6 and 10, 18 pages.

Eubank, W., "Summer Internet World '97, McCormick Place, Chicago, Illinois, Jul. 21-25, 1997", Aug. 1, 1996, updated Aug. 1, 1997, http://www.eubank-web.com/William/Articles/world97.htm, 5 pages.

No Author, "3D Conferencing White Paper," DiamondWare, May 19, 2005, 7 pages.

No Author, "3D Audio through the Internet," DiamondWare, May 15, 2005, 7 pages.

No Author, "Out With The Old, In With Palantir," DiamondWare, Sep. 28, 2003, 2 pages.

* cited by examiner

METHOD AND SYSTEM FOR CONTROLLING AUDIO IN A COLLABORATION ENVIRONMENT

FIELD OF THE INVENTION

The present invention relates generally to collaboration environments, and in particular to controlling the audio streams of collaboration participants.

BACKGROUND OF THE INVENTION

The cost and inconvenience of traveling has increased demand for effective collaboration environments that enable participants from multiple locations to easily connect with one another to discuss a topic. While a conference call may provide a suitable environment for a small group of participants discussing a particular topic, a conference call may not be appropriate for a larger group of participants, or for the discussion of a very complex topic. One problem with a conference call is that the audio streams carrying participant's voices are monaural, and therefore each participant's voice sounds as if it is in the same location. In a conference call with a small number of participants where each participant may know each other, and may recognize others voices, monaural audio streams may be satisfactory. But as participants in a conference call begin to talk simultaneously, as frequently happens as a discussion gains momentum, communications quickly become indecipherable as listeners cannot discern who is saying what. Many conferencing systems attempt to improve this situation by providing participants only the voice signals of the most active speaker, and those of the loudest participant attempting to interrupt the active speaker. This approach, however, effectively limits the conference to a single speaker and tends to prioritize loud and persistent speakers.

Even in the absence of concurrent conversations, participants in a monaural conference call can have trouble recognizing who is speaking unless they personally know the speaker well enough to recognize their voice. Even though a speaker may have previously introduced themselves, it can be difficult several minutes later to recognize the voice of someone you are not familiar with, especially where there are a large number of participants. This is largely because every participant sounds as if they are at the same location, and a listener is left with very few cues by which they can recall who is who. Since it is typically important to know who is talking in a conversation, this can lead to awkward interruptions as listeners ask a speaker to introduce themselves each time the individual begins speaking.

Another shortcoming of conventional collaboration environments, such as a conference call, is an inability to relatively easily implement common problem solving techniques that are used in normal face-to-face meetings. For example, in a business environment, it is common for a group of employees to meet in person in a conference room to discuss a complex topic that includes multiple subtopics. The group may begin discussing the topic, and determine that the most efficient way to resolve the issue is to divide themselves into subgroups, and assign each subgroup a subtopic to resolve. After the subgroups discuss and resolve the issues surrounding their respective subtopic, they meet again as a larger group to collaborate and resolve the overall issue. Unfortunately, it is difficult in a conventional conferencing environment to form subgroups of participants that can separately speak with one another, and easily reform the complete group after the subgroups complete their conversations. Moreover, such subgroups endure the same difficulties inherent in monaural communications mentioned previously.

In view of the shortcomings of conventional collaboration environments, it would be beneficial to provide a collaboration environment that realistically simulates face-to-face meetings. Moreover, it would be beneficial to provide a collaboration environment that allows participants to more easily engage in multiple concurrent conversations and to more easily recognize speakers based on a location of the speaker's voice, and permits forming subgroups of participants in a simple and intuitive manner.

SUMMARY OF THE INVENTION

The present invention provides a collaboration environment in which a moderator can position the voices of participants of a conference at desired aural positions. The conference includes several participants and a moderator. The participants and the moderator communicate via communication devices, such as computers. Each communication device establishes a communication session with a conference processor in a media server. When a participant speaks, the communication device generates an incoming audio stream containing the voice signals of the participant and sends the incoming audio stream to the conference processor. The communication session may also carry an outgoing audio stream from the conference processor to the communication device, where it can be provided to the participant. The moderator uses a multi-channel capable device, such as a stereo headset or stereo speakers, to listen to the outgoing audio stream provided to the moderator's communication device by the conference processor.

A user interface displays a participant icon corresponding to each participant in the conference to the moderator. The moderator can designate aural positions of the voices of the participants by manipulating the participant icons in the user interface. The communication device is coupled to the conference processor. Based on input received from the moderator, the communication device generates and sends aural position control signals that direct the conference processor to process a designated incoming audio stream and provide an outgoing audio stream that is perceived by a listener, such as the moderator, as coming from a particular aural position with respect to the listener. The conference processor receives the aural position control signals and processes the designated incoming audio stream to generate an outgoing audio stream that includes characteristics, such as frequency and/or phase characteristics, which aurally position the outgoing audio stream at a particular aural position with respect to the listener. The particular aural position may be identified in the aural position control signals by an aural position identifier that may include data identifying the desired aural position with respect to a reference location of the listener.

One or more of the participants in the conference may also use a multi-channel capable device, such as a stereo headset or stereo speakers, to listen to the outgoing audio stream provided to the respective participant's communication device by the conference processor. The participant may also have a user interface that displays icons representing one or more of the other participants in the conference. The participant may manipulate the participant icons to designate aural positions of the voices of the other participants. The communication device sends aural position control signals that direct the conference processor to process a designated incoming audio stream and provide an outgoing audio stream that is perceived by the participant as coming from a particular aural position with respect to the participant. The ability of a participant to alter the aural position of other participants may be dependent on rights granted by the moderator.

The moderator may also manipulate the user interface to control which of the participants can hear designated others of the participants. Based on input received from the moderator, the communication device sends mixing control signals to the conference processor that direct the conference processor to mix designated incoming audio streams to form one or more combined outgoing audio streams, and to provide the one or more outgoing audio streams to one or more of the participants of the conference via respective communication sessions. The moderator may manipulate the user interface to form subgroups of participants that can hear and talk with other participants in the same subgroup, but not with participants in other subgroups. The participants may have user interfaces that display icons representing the participants in their respective subgroup. Further, each participant may be able to manipulate a user interface to aurally position the voices of the participants in their subgroup.

The moderator may authorize one or more subgroups to initiate conversations with one or more other subgroups. If a participant in a first subgroup has authorization to initiate a conversation with a second subgroup, the participant may manipulate their user interface to indicate a desire to initiate conversations with the second subgroup. The communication device can send the conference processor a mixing control signal that directs the conference processor to mix the incoming audio streams associated with the participants in the second subgroup into outgoing audio streams that are provided to the participants in the first subgroup. The conference processor can also mix the incoming audio streams associated with the participants in the first subgroup into outgoing audio streams that are provided to the second subgroup. In this manner, participants in each of the first and the second subgroups can hear the participants in the other subgroup.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a collaboration environment in which a moderator can position the voices of participants of a conference at desired aural positions. For purposes of illustration only, the invention will be described herein in the context of an online education course, wherein the moderator is an instructor, and the participants are students. However, the present invention may be utilized in many different types of collaboration environments, including, for example, business related conferences, training courses, and the like. Through the use of a user interface, the present invention essentially provides a "what you see is how you hear" collaboration experience for a moderator, and in some embodiments, for one or more participants as well.

Figure 1:
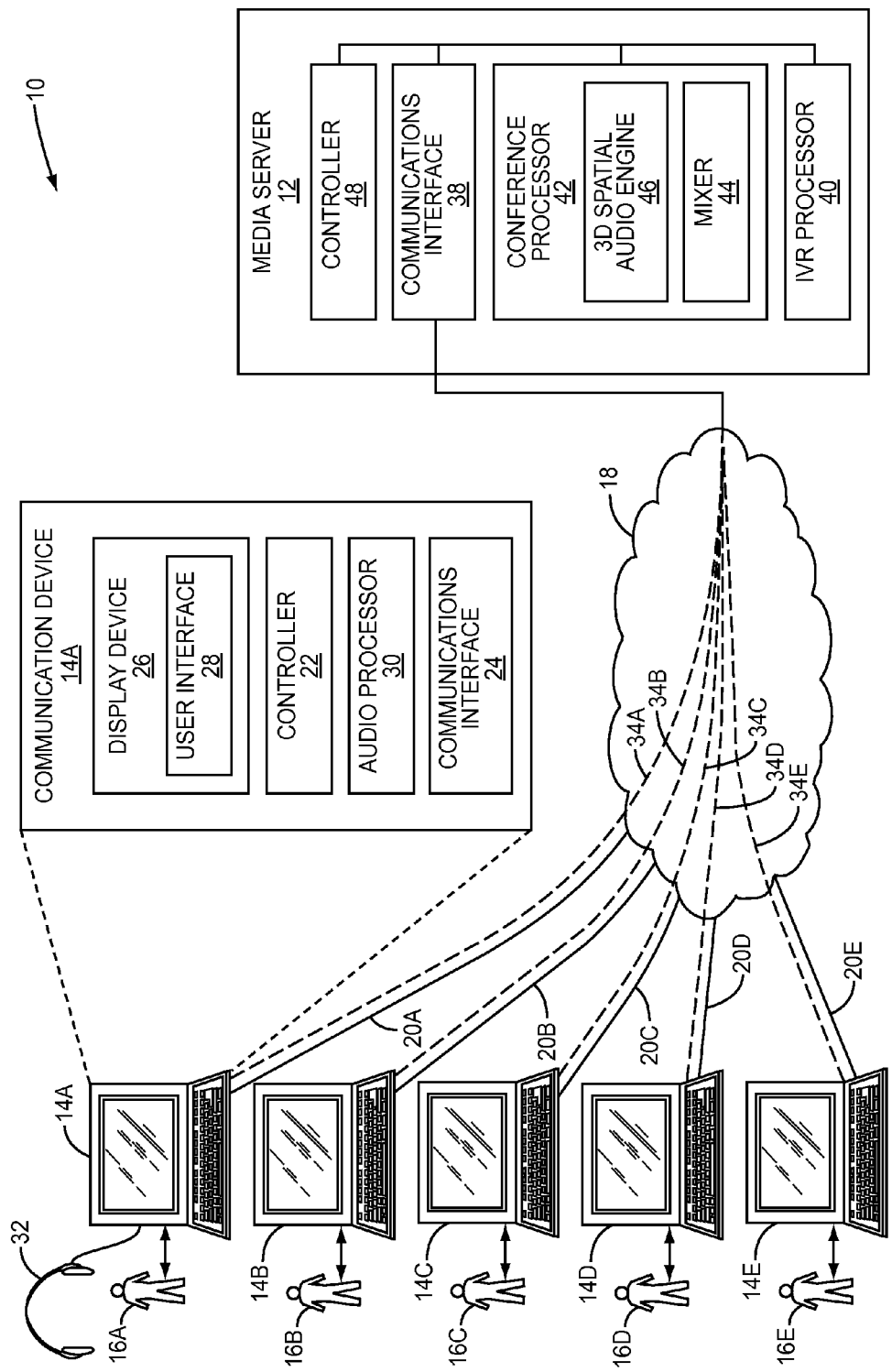
FIG. 1 is a block diagram illustrating a collaboration environment according to one embodiment of the invention.

FIG. 1 is a block diagram illustrating a collaboration environment 10 according to one embodiment of the invention. The collaboration environment 10 includes a media server 12 and a plurality of communication devices 14A-14E. The communication devices 14A-14E may be referred to herein collectively or singularly as the communication devices 14 or the communication device 14, respectively, wherein the discussion relates to any or all of the communication devices 14A-14E. The communications devices 14 may be any device capable of sending and receiving voice signals, and may comprise, for example, a computer, a PDA, a mobile phone such as an Apple® iPhone®, and the like. The present invention typically operates in the context of a conference, wherein a moderator user 16A and a plurality of participant users 16B-16E use the communication devices 14A-14E to talk with one another. The communication devices 14 are communicatively coupled to the media server 12 via a network 18. The communication devices 14A-14E may connect to the network 18 via any suitable network access paths 20A-20E, such as, for example, digital subscriber line technology, cable modem technology, cellular technology, Wi-Fi, Bluetooth, and the like. Data, such as control signals and audio streams, as described in greater detail herein, are typically carried over a corresponding network access path 20.

An exemplary communication device 14, such as the communication device 14A, includes a controller 22, which may include one or more central processing units and random access memory (not shown), for controlling the overall operation of the communication device 14A. The communication device 14A may also include a communications interface 24 for communications between the communication device 14A and external devices, such as the media server 12. The communication device 14A also includes, or is coupled to, a display device 26 upon which a user interface (UI) 28 may be displayed and manipulated by a user, such as the moderator user 16A. During a conference, data received from the media server 12 via the communications interface 24 may be used to update the user interface 28. Data generated by the communication device 14A in response to manipulations of the user interface 28 may be provided to the media server 12 via the communications interface 24. The communication device 14A also preferably includes an audio processor 30 which generates an audio stream comprising the voice signals of the moderator user 16A, and sends the audio stream to the media server 12. The audio processor 30 also receives outgoing audio streams from the media server 12 and provides the outgoing audio streams to the moderator user 16A via a multi-channel capable device, such as a stereo headset 32. Those skilled in the art will recognize other multi-channel capable devices, such as stereo speakers, may also be used to provide the outgoing audio streams to the moderator user 16A.

Each of the communication devices 14 establishes a communication session 34, denoted by reference characters 34A-34E, respectively, with the media server 12. A communication session 34 may comprise any type of session or connection between a respective communication device 14 and the media server 12 that enables the transmission of an audio stream from the respective communication device 14 to the media server 12, and the receipt of an audio stream from the media server 12 to the respective communication device 14, irrespective of the underlying physical infrastructure used to carry the audio stream, or particular protocol used to establish the communication session 34 between the respective communication device 14 and the media server 12. Suitable protocols may include, for example, TCP/IP, Session Initiation Protocol (SIP), conventional PSTN signaling, and the like. The communication sessions 34 are typically physically implemented over a corresponding network access path 20.

Participant users 16B-16E use the communication devices 14B-14E to participate in the collaboration environment 10. A distinction between the moderator user 16A and the participant users 16B-16E may be based on a user's role, or may be relatively arbitrary, and based, for example, on who initially arranged for a conference in the collaboration environment 10. For example, the moderator user 16A may be an instructor of a class, and each of the participant users 16B-16E may be students. Alternately, the moderator user 16A may simply have been the employee who arranged the conference, or a manager of a group of employees who are going to discuss a problem. For purposes of brevity, hereinafter the moderator user 16A will be referred to as the moderator 16A, and the participant users 16B-16E will be referred to as the participants 16B-16E. In one embodiment, the control exercised by the moderator 16A may be delegated to one or more participants 16B-16E. Alternatively, the moderator 16A and a participant 16B-16E may swap roles, wherein the moderator becomes a participant and the participant becomes a moderator.

The media server 12 includes a communications interface 38 that interfaces with the communication sessions 34. The communications interface 38 can comprise any suitable combination of hardware and or software necessary to receive incoming audio streams from the communication sessions 34, and send outgoing audio streams over the respective communication sessions 34. For example, the communications interface 38 could comprise line cards if the communication sessions 34 carry analog voice signals, or could comprise Ethernet circuitry if the communication sessions 34 carry packetized voice signals. The media server 12 may also include an interactive voice recognition (IVR) processor 40 for routing a communication session 34 to the appropriate conference.

The media server 12 also includes a conference processor 42 that may establish a conference between the participants 16B-16E and the moderator 16A at the direction of the moderator 16A. The conference processor 42 includes a mixer 44 that enables the conference processor 42 to mix or combine multiple audio streams and provide a mixed outgoing audio stream to one or more communication sessions 34, as directed by the moderator 16A. Additional functionality provided by the mixer 44 will be described in greater detail herein. The conference processor 42 includes, or is coupled to, a three-dimensional (3D) spatial audio engine (3DSAE) 46, which receives incoming audio streams and aural position identifiers, modifies the audio streams, and generates outgoing audio streams that include characteristics, such as phase and frequency information, that aurally position the outgoing audio streams at an aural position indicated by the aural position identifier.

While for purposes of illustration the conference processor 42 is illustrated as containing the 3DSAE 46, the functionality of the 3DSAE 46 may be integral with the conference processor 42 as illustrated, or may be separate from the conference processor 42 and coupled to the conference processor 42 via a communications path. Similarly, while the mixer 44 is illustrated separately from the 3DSAE 46, the 3DSAE 46 may also have mixing capabilities in addition to, or in lieu of, mixing capabilities contained in the mixer 44. Thus, the functionality provided by the conference processor 42, the 3DSAE 46, and the mixer 44 may be implemented by the media server 12 in one or more modules, depending on desired design criteria. Thus, for purposes of illustration and brevity, functionality provided by any of the conference processor 42, the 3DSAE 46, or the mixer 44 will generally be described as being provided by the conference processor 42 hereinafter. The media server 12 also includes a controller 48 which includes a central processing unit and random access memory (not shown), which is coupled to each of the communications interface 38, the IVR processor 40, and the conference processor 42, to control operations thereof.

The present invention provides the moderator 16A the ability to aurally position the audio streams generated by the participants 16B-16E at desired aural positions with respect to the moderator 16A. Aural positioning is provided by the conference processor 42 via the 3DSAE 46. The 3DSAE 46 can aurally position an audio stream by generating an outgoing audio stream that includes characteristics, such as frequency and phase information that aurally positions the outgoing audio stream so that it is perceived by a listener, such as the moderator 16A, as originating from a designated position. The incoming audio streams may be monaural or multi-channel. The outgoing voice signals are multi-channel voice signals, such as stereo or Dolby Digital 5.1 voice signals, and are provided to the moderator 16A via the stereo headset 32. A 3DSAE suitable for use in the present invention may be obtained from DiamondWare, Ltd., 4856 E. Baseline Rd. Ste. 101, Mesa, Ariz. 85206.

Figure 2:
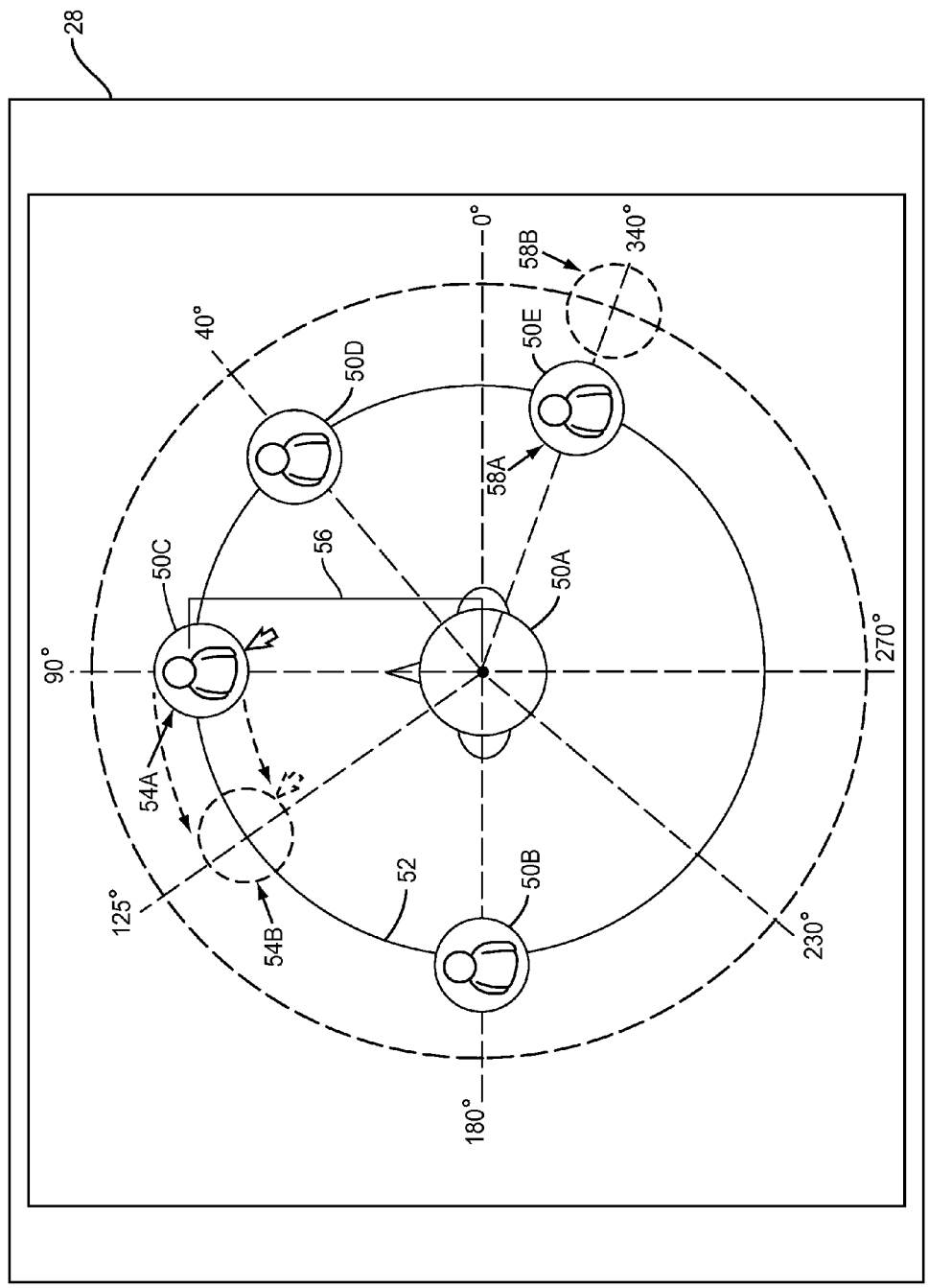
FIG. 2 illustrates a user interface for aurally positioning voice signals of participants in a collaboration environment with respect to a moderator according to one embodiment of the invention.

FIG. 2 illustrates an exemplary user interface 28 that may be provided by the communications device 14A and displayed on the display device 26, and will be discussed in conjunction with FIG. 1. The moderator 16A may manipulate the user interface 28 to aurally position audio streams associated with one or more of the participants 16B-16E. A moderator icon 50A represents a reference location of the moderator 16A. Each of the participants 16B-16E are represented by corresponding participant icons 50B-50E. The user interface 28 may include a positioning circle 52, which may aid the moderator 16A while manipulating one or more of the participant icons 50B-50E within the user interface 28. The positioning circle 52 may have a "snap-to" characteristic, if desired, which centers a specific participant icon 50B-50E on the positioning circle 52 if the moderator 16A moves one of the participant icons 50B-50E within a predetermined distance from the positioning circle 52.

For each of the participant icons 50B-50E in the user interface 28, the communications device 14A calculates an aural position identifier corresponding to the position of the respective participant icons 50B-50E with respect to the reference position of the moderator icon 50A. The aural position identifier may comprise any suitable information that can identify a position of a respective participant icon 50B-50E with respect to the moderator icon 50A. For example, the aural position identifier may comprise an angle of the respective participant icon 50B-50E with respect to an orientation of the moderator icon 50A, and a distance of the respective participant icon 50B-50E from the moderator icon 50A. The angle can be used by the 3DSAE 46 to generate an outgoing audio stream associated with a respective participant with the appropriate characteristics, such as frequency and phase information, so that the outgoing audio stream is perceived by the moderator 16A as originating from the direction indicated by the aural position identifier. The distance information may be used by the 3DSAE 46 to alter the loudness characteristics of the outgoing audio stream.

Referring to the participant icon 50C, assume that the participant icon 50C is initially at a position 54A. The participant icon 50C may have been positioned in such location by default by the user interface 28 upon being informed of a connection of the communication session 34C to the media server 12, or the moderator 16A may have, using an input device such as a mouse or a touch screen, previously dragged the participant icon 50C to the position 54A. In either event, the communications device 14A calculates an aural position identifier corresponding to the position 54A. Assume that the aural position identifier include the angle of offset with respect to an orientation of the moderator icon 50A. Assume further that the moderator icon 50A has an orientation toward a 90 degree location on a 360 degree circle 52. In other words, the moderator icon 50A is "looking" toward the 90 degree mark on the 360 degree circle 52. Thus, the moderator's "ears" are oriented toward the 180 degree mark and 0 degree mark, respectively. Note that the 360 degree circle 60 is provided for purposes of illustration, and would not necessarily be depicted in the user interface 28.

The communications device 14A determines that the position 54A of the participant icon 50C is at a 90 degree position (i.e., straight ahead of the moderator icon 50A), and is located a distance 56 from the moderator icon 50A. The aural position identifier thus, in this example, may include the angle, 90 degrees, and the distance 56. The communications device 14A sends the media server 12 an aural position control signal that includes the aural position identifier and a communication session identifier identifying the communication session 34C. The 3DSAE 46 aurally positions the audio stream associated with the participant 16C at the aural position identified by the aural position identifier.

Assume that the moderator 16A drags the participant icon 50C to a new position 54B. The communications device 14A obtains the new position 54B of the participant icon 50C in the user interface 28, such as by obtaining x,y coordinates of the participant icon 50C, and calculates a new aural position identifier. The communications device 14A provides the new aural position identifier and the communication session identifier to the media server 12. The 3DSAE 46 aurally positions the audio stream associated with the participant 16C to be at the approximately 125 degree position (i.e., 35 degrees to the left of where the audio stream was previously aurally positioned) with respect to the moderator icon 50A. The moderator 16A, using the stereo headset 32 for example, now hears the voice of the participant 16C to the left of where the moderator 16A previously heard the voice of the participant 16C prior to moving the participant icon 50C from the position 54A.

The moderator 16A may decide that the voice of the participant 16E is too loud. The moderator 16A may move the participant icon 50E corresponding to the participant 16E from a first position 58A to a new position 58B, which is farther from the moderator icon 50A. The communications device 14A will generate a new aural position identifier that indicates a greater distance between the participant icon 50E and the moderator icon 50A, and provide the new aural position identifier to the media server 12. The 3DSAE 46 will use the new aural position identifier to decrease the loudness of the outgoing audio stream corresponding to the participant 16E.

According to one embodiment of the invention, in addition to aurally positioning the audio streams of the participants 16B-16E, the moderator 16A can manipulate the user interface 28 to control audio stream mixing by the conference processor 42. By controlling the mixing of audio streams, the moderator 16A can determine who will participate in the conference, who can hear who, and who can communicate with whom. In further embodiments, one or more of the communication devices 14B-14E include multi-channel capable audio devices, such as the stereo headset 32. The communication devices 14B-14E may also include a user interface, similar to the user interface 28, which allows a respective participant 16B-16E to aurally position the audio streams of other participants 16B-16E of the conference in relation to themselves, and listen to a custom aurally positioned audio stream through the multi-channel capable audio devices.

Figure 3:
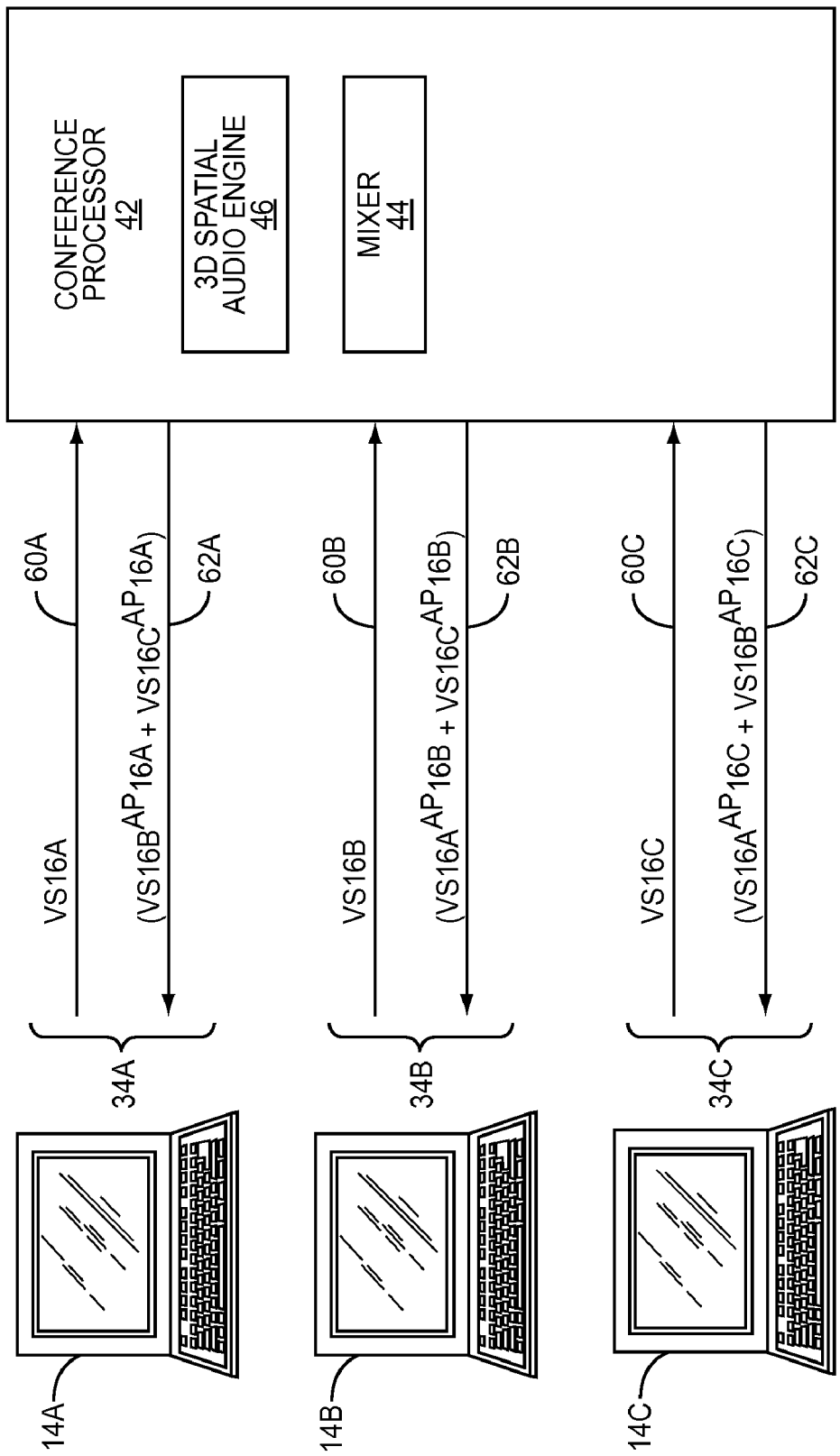
FIG. 3 is a block diagram of a conference processor according to one embodiment of the invention providing different outgoing audio streams from a plurality of incoming audio streams.

FIG. 3 is a block diagram illustrating mixing and aural positioning aspects of the present invention wherein the conference processor 42 generates a plurality of mixed outgoing audio streams which are aurally positioned by the respective recipient of each mixed outgoing audio stream. Assume that the participants 16B, 16C each have a user interface displayed on a respective display device 26 associated with their respective communication devices 14B, 14C. Assume further that the moderator 16A has manipulated the user interface 28 such that the participant 16B can hear and talk to the moderator 16A and the participant 16C, and that the participant 16B has aurally positioned the voices of the moderator 16A and the participant 16C at desired aural positions in a similar fashion as described previously with respect to FIG. 2. Assume that the participant 16C likewise can hear and talk to the moderator 16A and the participant 16B, and that the participant 16C has aurally positioned the voices of the moderator 16A and the participant 16B at desired aural positions. Also assume that the moderator 16A can hear and talk to the participant 16A and the participant 16B and has aurally positioned the voices of the participants 16B, 16C at desired aural positions.

In FIG. 3, the notation "VS" stands for voice signals and the reference characters following the VS notation indicates who generated the respective voice signals. For example, an incoming audio stream 60A carries an audio stream containing voice signals of the moderator 16A, as indicated by the notation "VS16A". The phrase "incoming" and "outgoing" are used for purposes of illustration, and are from the perspective of the conference processor 42. Thus, audio streams being sent to the conference processor 42 are described herein as "incoming" and audio streams being sent from the conference processor 42 are described as "outgoing." An outgoing audio stream 62A may include one or more incoming audio streams 60, including one or more incoming audio streams 60 that have been modified to be aurally positioned at designated aural positions.

The superscript "AP" following the identification of the user that generated the voice signals indicates that the voice signals have been aurally positioned by the conference processer 42. The subscript following the "AP" superscript indicates who designated the aural positions. For example, the notation "VS16B$^{AP}_{16A}$" indicates voice signals generated by the participant 16B that have been aurally positioned at an aural position designated by the moderator 16A. The conference processor 42 can generate a "mixed" outgoing audio stream that comprises the audio streams of multiple participants of the conference. For example, the outgoing audio stream 62A includes an audio stream generated by the participant 16B that has been aurally positioned by the moderator 16A, as well as an audio stream generated by the participant 16C that has also been aurally positioned by the moderator 16A, as indicated by the notation "(VS16B$^{AP}_{16A}$+ VS16C$^{AP}_{16A}$)". As illustrated in FIG. 3, the conference processor 42 may generate multiple different outgoing audio streams 62A-62C from the same incoming audio stream 60A-60C, wherein each outgoing audio stream 62A-62C includes different aural position characteristics, as designated by the respective participant receiving the outgoing audio streams 62A-62C.

Figure 4:
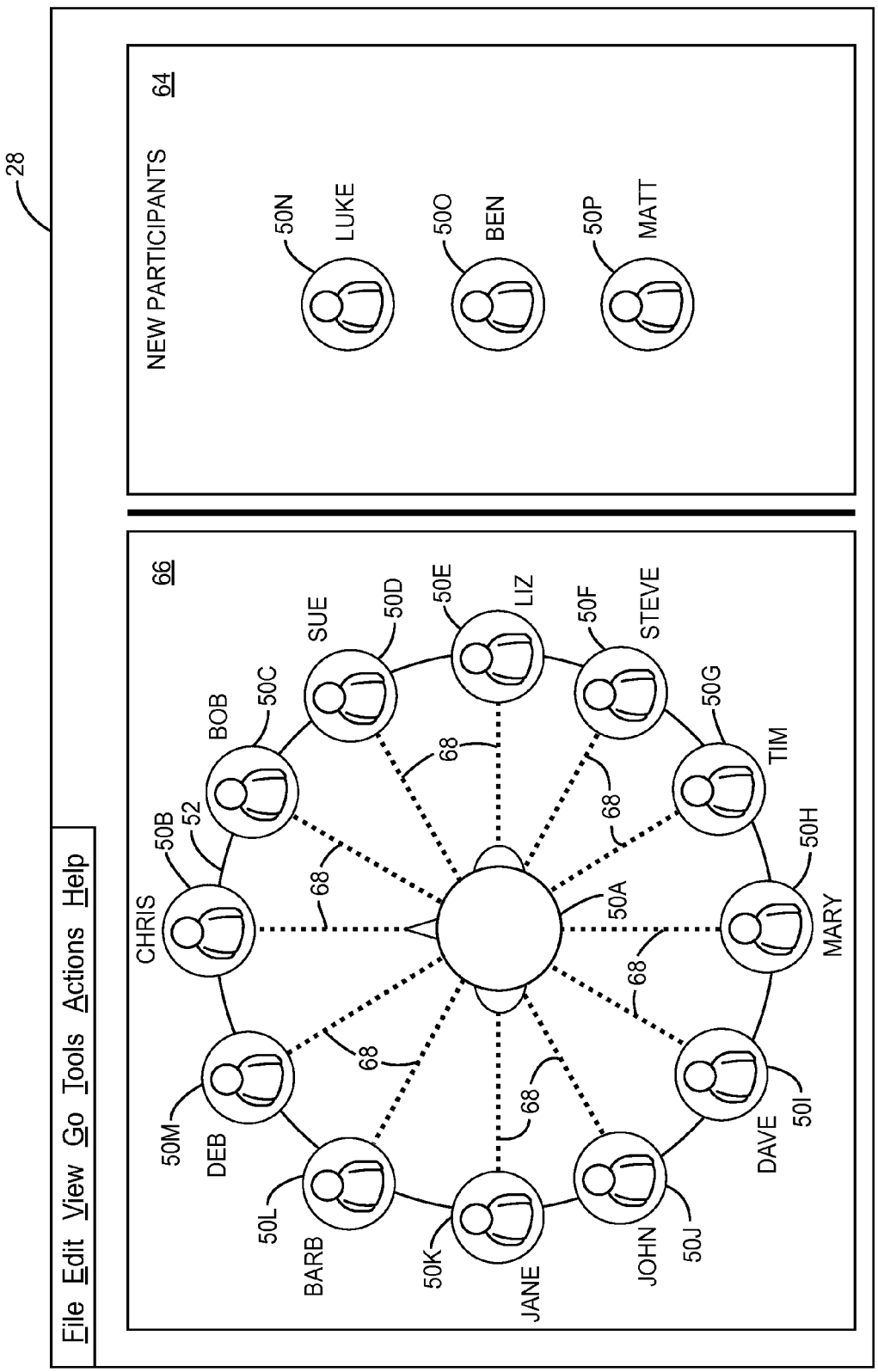
FIG. 4 illustrates a user interface for enabling a moderator to select which of multiple participants in a collaboration environment may collaborate with others of the participants.

FIG. 4 illustrates the user interface 28 wherein the moderator 16A manages a conference as new participants join the conference. When a new communication session 34 connects to the media server 12, the media server 12 provides a message to the communications device 14A identifying a connection of a new communication session 34, and can include a communication session identifier uniquely identifying the new communication session 34. The communications device 14A can then provide a new participant icon 50 in a first display area 64 of the user interface 28, such as illustrated by participant icons 50N-50P. Each participant icon in the user interface 28 corresponds to a particular communications session 34 and participant 16. Thus, the participant icons 50B-50P correspond to communication sessions 34B-34P, respectively, as well as to participants 16B-16P, respectively. The participant icons may be labeled with information, such as a name of a corresponding participant, which may have been provided by the participant to the media server 12 during the session initiation process. Before the participant icons 50N-50P are moved from the first display area 64 to the second display area 66, the participants 16N-16P may hear music, or a message indicating they will be joined to the conference upon approval by the moderator 16A.

As the moderator 16A selects a participant icon 50N-50P in the first display area 64 and drags the participant icon 50N-50P to the second display area 66, the corresponding communication session 34N-34P is provided an outgoing audio stream by the conference processor 42. The default behavior of the conference may be selected by the moderator 16A. The moderator 16A may configure the conference such that by default, a communication session 34 corresponding to a participant icon 50 in the second display area 66 is only provided the incoming audio stream generated by the moderator 16A. Alternately, the default configuration may be that the communication session 34 is provided the incoming audio streams generated by all the other participants having a corresponding participant icon 50 in the second display area 66. Assume, for example, that the moderator 16A drags the participant icon 50N from the first display area 64 to the second display area 66. Assume further that the default behavior is that each participant 16 can hear the other participants 16 as well as the moderator 16A. The communication device 14A sends a mixing control signal to the conference processor 42 identifying the communication session 34N corresponding to the participant icon 50N, and mixing instructions directing the conference processor 42 to provide the communication session 34N an outgoing audio stream that includes the incoming audio streams from each of the other communication sessions 34. The conference processor 42 will also provide the new incoming audio stream from the communication session 34N to the other communication sessions 34, so each participant 16 and the moderator 16A can hear the new participant 16N.

Preferably the moderator 16A can easily select one or more particular participants 16 with whom the moderator 16A wants to speak, or easily indicate that the moderator 16A wants all the participants 16 to hear the moderator 16A, through manipulation of the user interface 28. For example, double-clicking on the moderator icon 50A may indicate the moderator 16A wishes to speak to all the participants 16. The communications device 14A sends the conference processor 42 a mixing control signal instructing the conference processor 42 to provide the incoming audio streams generated by the moderator 16A to each of the communication sessions 34. The user interface 28 may display dashed lines 68 to indicate that each of the participants 16B-16M can hear the moderator 16A. Double clicking again on the moderator icon 50A may indicate that the moderator 16A wants none of the participants 16B-16M to be able to hear the moderator 16A. The communications device 14A sends the conference processor 42 a mixing control signal instructing the conference processor 42 not to send the incoming audio streams generated by the moderator 16A to any of the communication sessions 34B-34M.

Single clicking on a particular participant icon 50 may initiate a direct conversation with only the participant 16 corresponding to the participant icon 50. For example, assume the moderator 16A wants to inform the participant 16K, "Jane", that Jane is being disruptive, without the rest of the participants 16B-16J, 16L-16M hearing this exchange. The moderator 16A may single click on the participant icon 50K. The communications device 14A may send the conference processor 42 a mixing control signal instructing the control processor 42 to provide the incoming audio streams of the moderator 16A to only the communication session 34K. Double clicking on a particular participant icon 50B-50M may further direct the communication device 14A to generate and send to the control processor 42 a mixing control signal such that the respective participant's 16 incoming audio stream may only be provided to the moderator 16A. In this manner, the moderator 16A can easily and intuitively establish one-on-one conversations with any of the participants 16B-16M as desired.

Figure 5:
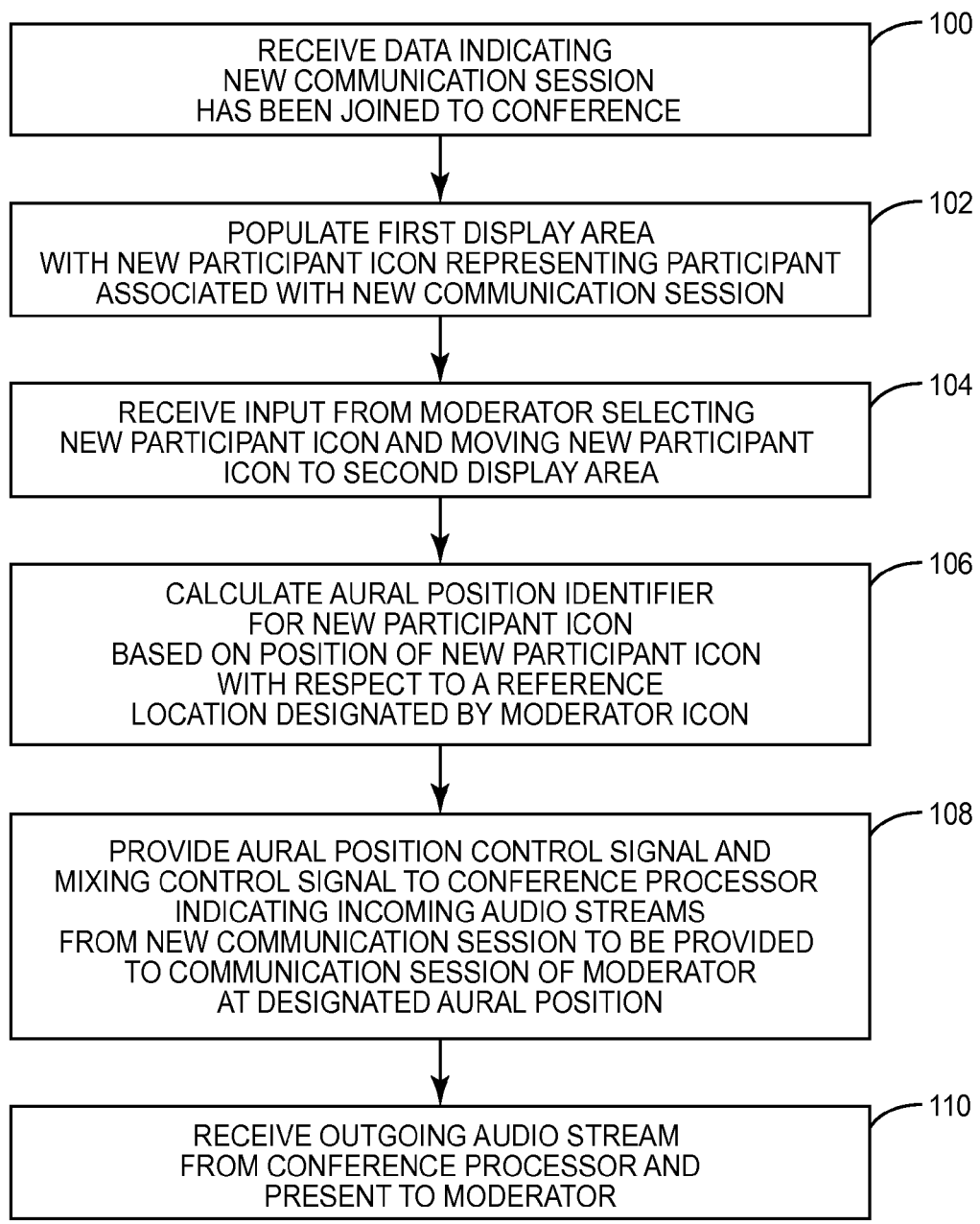
FIG. 5 is a flow diagram illustrating a method for aurally positioning an audio stream of a participant with respect to a reference location of the moderator.

FIG. 5 is a flow diagram illustrating a method for designating aural positions of audio streams associated with new participants 16 that have joined the conference according to one embodiment of the invention. As the communication session 34 corresponding to the new participant 16 connects to the media server 12, the media server 12 sends the communication device 14A of the moderator 16A data identifying the new communication session 34 (step 100). The user interface 28 displays a new participant icon 50 in the first display area 64 (FIG. 4) corresponding to the participant 16 associated with the new communication session 34 (step 102). The moderator 16A selects the participant icon 50 and moves the participant icon 50 from the first display area 64 to the second display area 66 (step 104). The communication device 14A calculates an aural position identifier based on the position of the new participant icon 50 with respect to a reference location in the second display area 64 (step 106). According to one embodiment of the invention, the reference location is indicated by the position of the moderator icon 50A. The communication device 14A sends the aural position identifier and a communications session identifier identifying the communication session 34 corresponding to the participant icon 50 to the conference processor 42 (step 108). The conference processor 42 generates a new outgoing audio stream based on the incoming audio stream from the identified communication session 34 that positions the outgoing audio stream at the identified aural position. The conference processor 42 mixes the new outgoing audio stream with any other audio stream destined for the moderator 16A, and provides the mixed outgoing audio stream to the communication session 34A, where it is received by the communication device 14A (step 110).

According to one embodiment of the invention, one or more of the participants 16B-16P have multi-channel capable devices, such as stereo headsets, and have a user interface 28 executing on their corresponding communication device 14B-14P. Each of the participants 16B-16P may designate aural positions for each of the other participants 16B-16P via a drag-and-drop interface as described herein with respect to FIG. 4. The respective communication devices 14B-14P can provide aural position identifiers for each of the respective audio streams to the conference processor 42, which can provide unique mixed outgoing audio streams to each of the communication sessions 34 aurally positioning the voices of each of the participants 16B-16P at desired aural positions.

Figure 6:
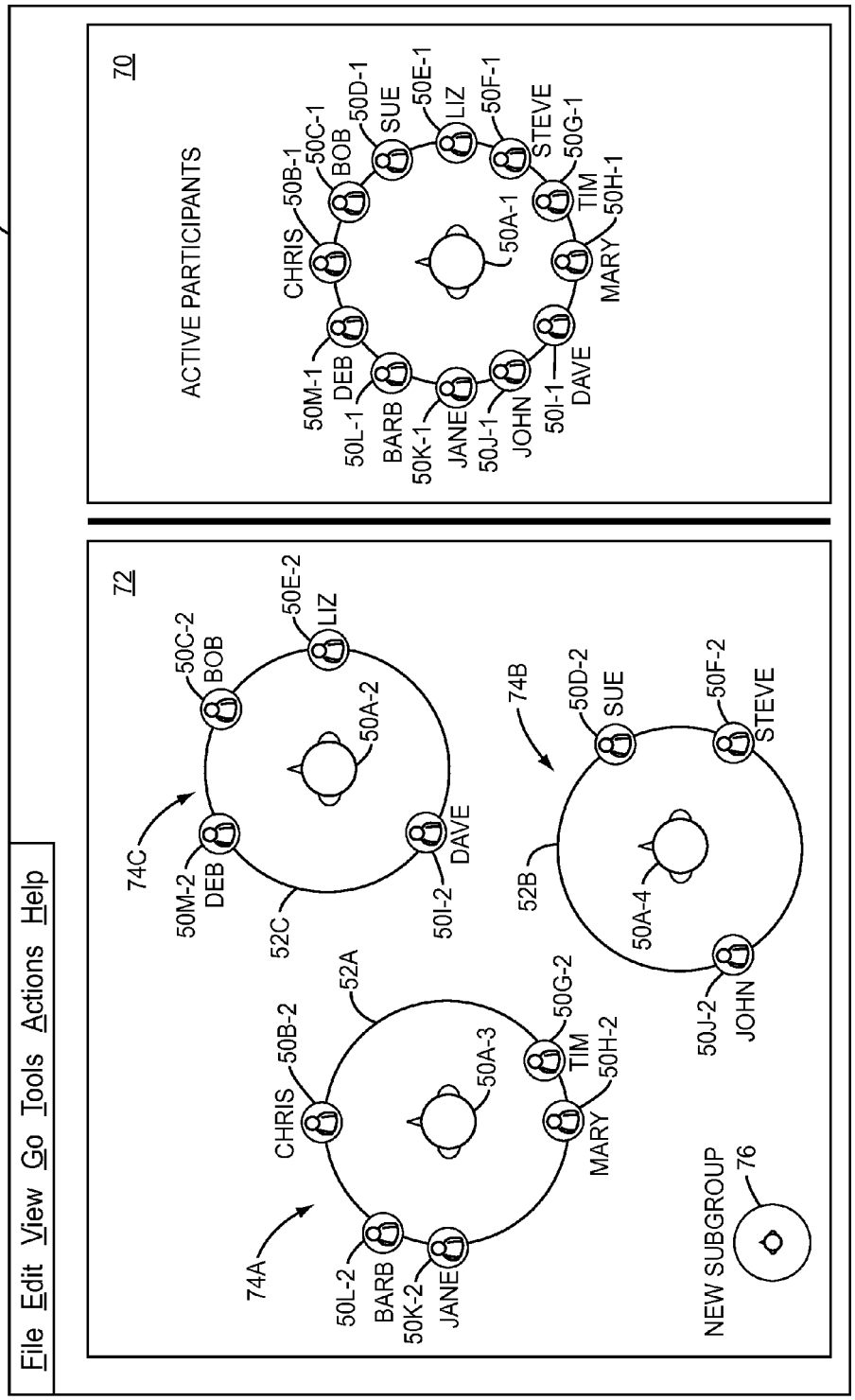
FIG. 6 illustrates a user interface for enabling a moderator to form subgroups of the participants.

FIG. 6 illustrates the user interface 28 according to another embodiment of the present invention wherein the moderator 16A can create subgroups of participants 16B-16P via the user interface 28. The user interface 28 includes a first display area 70 wherein participant icons 50B-1 through 50M-1 represent corresponding participants 16B-16M participating in the conference. In a second display area 72, the moderator 16A has formed subgroups 74A-74C of participant icons 50B-2 through 50M-2, wherein corresponding participants 16B-16M can only communicate with other participants 16B-16M in their respective subgroup 74A-74C. Assume, for example, that the moderator 16A is an instructor, and that each of the participants 16B-16M are students. The moderator 16A has determined that each of the participants 16B-16M are having problems with one of three topics. The moderator 16A wants the participants 16B-16M struggling with a particular topic to meet amongst themselves and discuss an extra assignment designed to aid in the process of learning the topic. The moderator 16A clicks on a new subgroup icon 76, causing the communications device 14A to display a positioning circle 52A in the second display area 72. Assume that the moderator 16A selects the participant icons 50B-1, 50G-1, 50H-1, 50K-1, and 50L-1 from the first display area 70, individually or collectively, and drags the icons on top of, or near, the positioning circle 52A. Upon dropping the participant icons 50B-1, 50G-1, 50H-1, 50K-1, 50L-1 onto the positioning circle 52A, the communications device 14A creates copies of such participant icons to appear on the positioning circle 52A, illustrated in FIG. 6, as participant icons 50B-2, 50G-2, 50H-2, 50K-2, and 50L-2. The communication device 14A, as described previously, can determine aural position identifiers for each of the participant icons 50B-2, 50G-2, 50H-2, 50K-2, and 50L-2, and provide the aural position identifiers to the conference processor 42, for generating and mixing an outgoing audio stream for the moderator 16A, as described previously. The communication device 14A also sends a mixing control signal to the conference processor 42 instructing the conference processor 42 that the audio streams of the communication sessions 34B, 34G, 34H, 34K, and 34L are to be provided to one another, but not to the other communication sessions 34. In this manner, the participants 16B, 16G, 16H, 16K, and 16L can communicate amongst one another.

Assume that the moderator 16A repeats the previously discussed process for subgroups 74B and 74C, each time dragging participant icons 50 to one or the other of the subgroups 74B, 74C depending on the particular topic with which the corresponding participant 16 requires help. Each of the participants 16 at a respective subgroup can speak with other participants 16 at their respective subgroup 74, but not with other participants 16, based on the mixing control signals generated by the communications device 14A in response to the manipulation of the user interface 28 by the moderator 16A.

Figure 7:
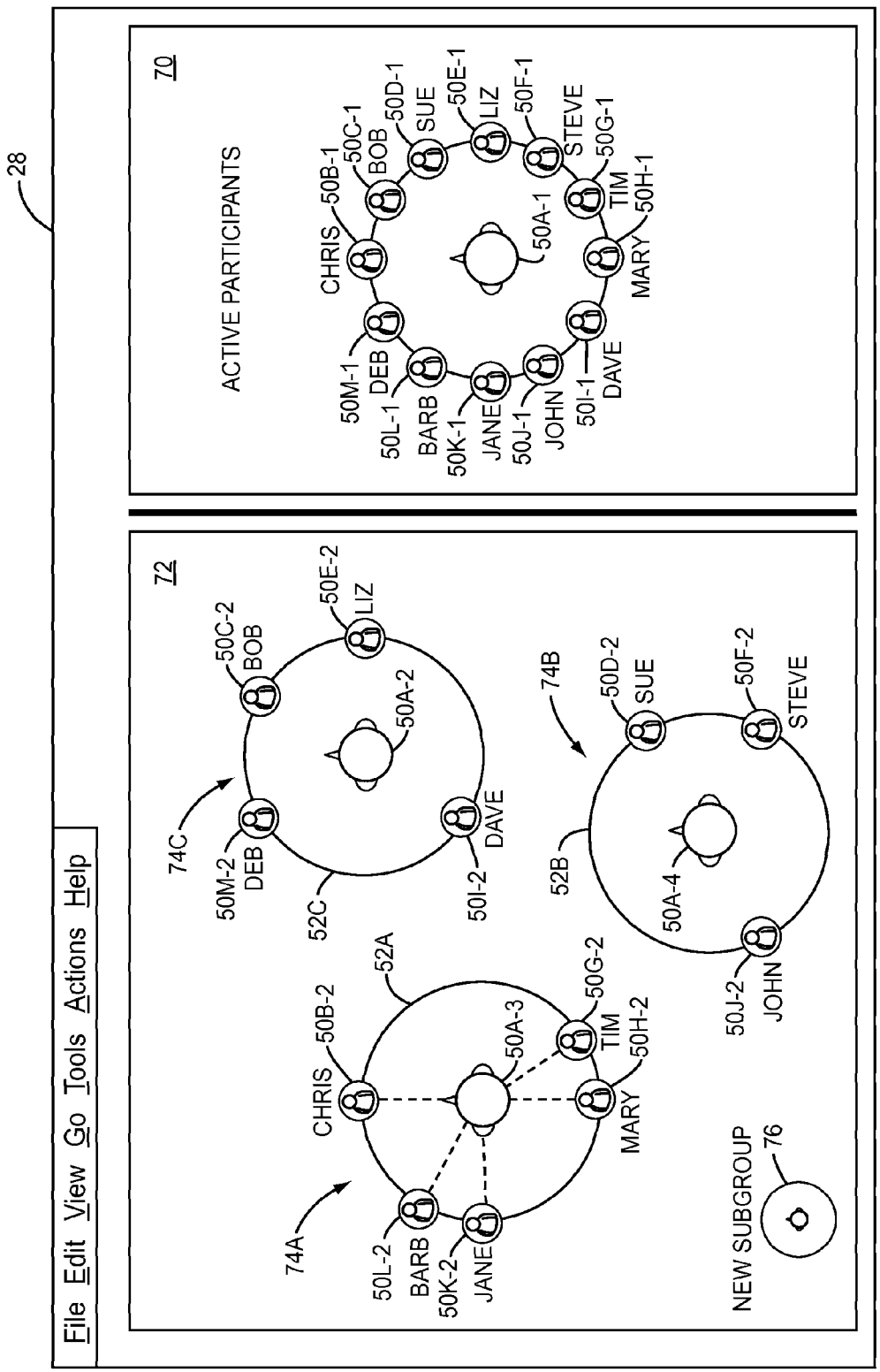
FIG. 7 illustrates the user interface shown in FIG. 6, wherein participants in one subgroup can hear the moderator, and participants in other subgroups cannot hear the moderator.

FIG. 7 illustrates a further embodiment of the user interface 28 shown in FIG. 6, wherein the moderator 16A can easily choose to converse with the participants 16 in a particular subgroup 74, or can easily choose to converse with all the participants 16. Assume that the moderator 16A wishes to speak with the participants 16B, 16G, 16H, 16K, 16L of the subgroup 74A. The moderator 16A may double click on the moderator icon 50A-3, which instructs the communication device 14A to generate and send a mixing control signal to the conference processor 42. The mixing control signal identifies the communication sessions 34B, 34G, 34H, 34K, and 34L corresponding to the participants 16B, 16G, 16H, 16K, 16L in the subgroup 74A, and instructs the conference processor 42 to provide the incoming audio streams associated with the communication sessions 34B, 34G, 34H, 34K, and 34L to the moderator 16A, at the aural positions corresponding to the participant icons 50B-2, 50G-2, 50H-2, 50K-2, and 50L-2, and to provide the incoming audio stream from the moderator 16A to the communication sessions 34B, 34G, 34H, 34K, and 34L. If the moderator 16A wishes to speak to all the participants 16B-16M, the moderator 16A may double click on the moderator icon 50A-1 in the first display area 70. The communications device 14A can generate and send to the conference processor 42 a mixing control signal to enable all the participants 16B-16M to hear the moderator 16A.

According to another embodiment of the invention, the moderator 16A may authorize the participants 16 in the subgroups 74 to initiate communications with other participants 16 in other subgroups 74. For example, the moderator 16A may recognize that the participants 16C, 16E, 16I, 16M in the subgroup 74C understand the topic being discussed in the subgroup 74B very well, and that if the participants 16D, 16F, 16J in the subgroup 74B need some help, the participants 16C, 16E, 16I, 16M in the subgroup 74C may be able to help them. The moderator 16A may effectuate this authorization via the user interface 28 such as, for example, by right-clicking on the subgroup 74B, and selecting an "Allow Communications With Other Subgroups" menu option (not shown). The communication device 14A may provide this data to the media server 12 for storing this configuration data in a memory in the media server 12.

Figure 8A:
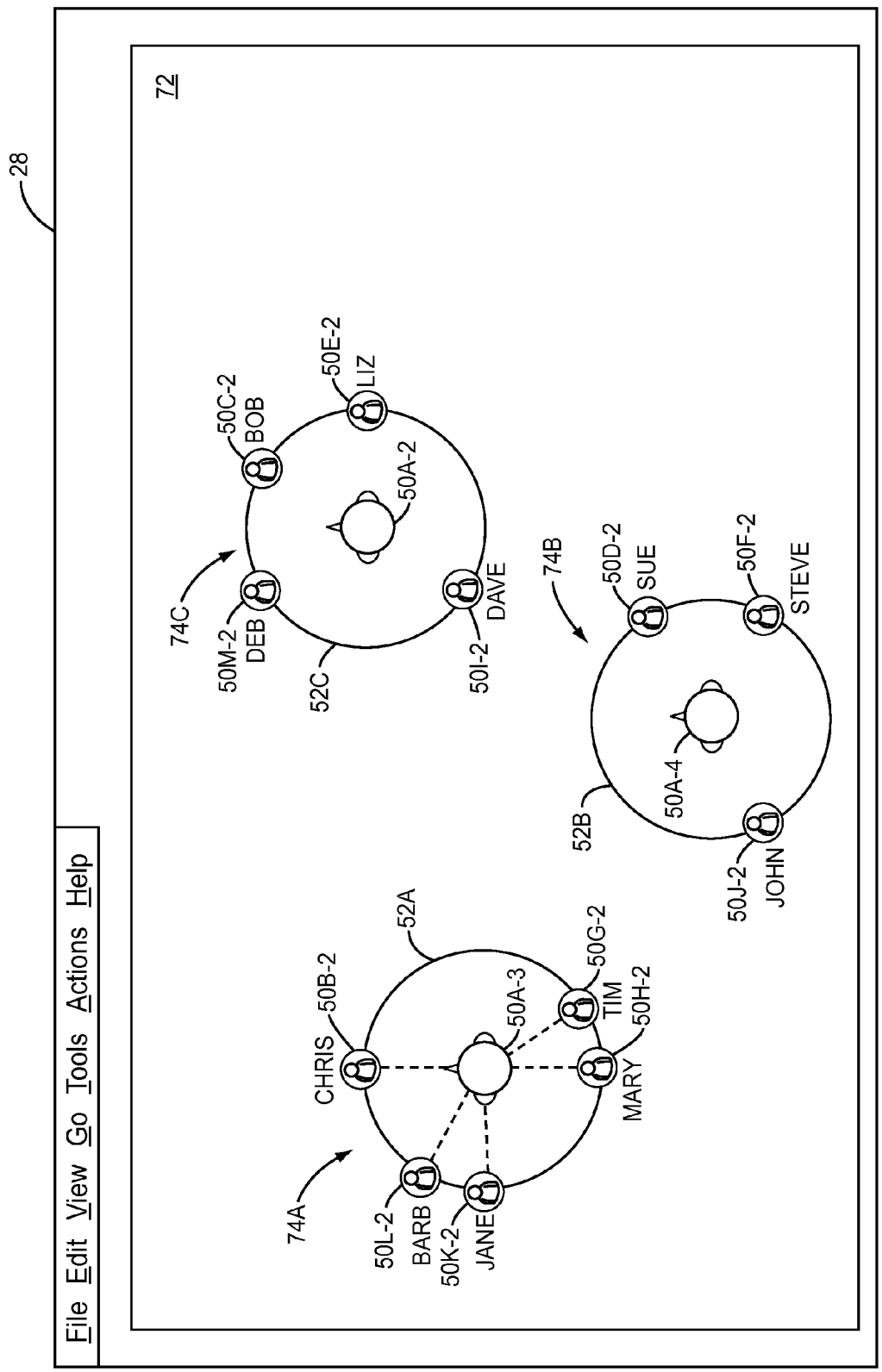
FIG. 8A illustrates a user interface for enabling a first participant to aurally position the audio streams of other participants in the same subgroup with respect to a reference position of the first participant.

FIG. 8A is a user interface 28 that may be used by the participants 16D, 16F, 16J in the subgroup 74B to initiate communications with the participants 16C, 16E, 16I, 16M in the subgroup 74C. Assume that the participant 16J, John, wishes to initiate communications with the participants 16C, 16E, 16I, 16M in the subgroup 74C. The participant 16J may select the subgroup 74C and attempt to drag the subgroup 74C close to the subgroup 74B. The communication device 14J used by the participant 16J will issue a request to the media server 12. The media server 12 can check the configuration option in the memory to determine whether the moderator 16A gave the subgroup 74B authorization to initiate communications with the subgroup 74C. If not, the media server 12 can inform the communication device 14J that the action is not permitted, and the user interface 28 may not allow the subgroup 74B to be dragged near the subgroup 74C. Assume, however, that such authorization was provided by the moderator 16A, and the media server 12 informs the communication device 14J that the requested action is permitted.

Figure 8B:
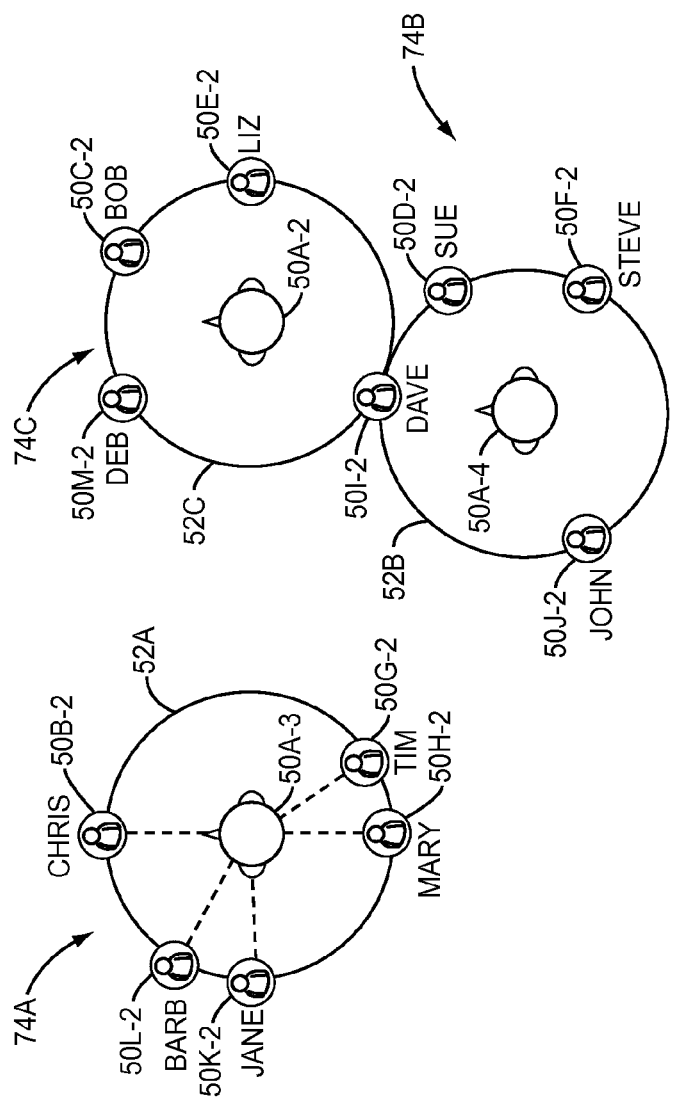
FIG. 8B illustrates the user interface shown in FIG. 8A for enabling one subgroup to initiate communications with a second subgroup.

FIG. 8B illustrates the user interface 28 after the participant 16J has dragged the subgroup 74C adjacent the subgroup 74B. Upon detecting that the subgroup 74C is adjacent the subgroup 74B, the communication device 14J creates a mixing control signal and sends the mixing control signal to the conference processor 42. The mixing control signal can identify the communication sessions 34C, 34E, 34I, and 34M corresponding to the participants at the subgroup 74C, and instruct the conference processor 42 to provide the incoming audio streams associated with communications sessions 34C, 34E, 34I, and 34M to the communication sessions 34D, 34F, and 34J. The mixing control signal can also instruct the conference processor 42 to provide the incoming audio streams associated with the communication sessions 34D, 34F, and 34J to the communications sessions 34C, 34E, 34I, and 34M. In this manner, each of the participants at the subgroup 74B can speak to the participants at the subgroup 74C, and vice versa. The communications device 14J may instruct the conference processor 42 to aurally position each of the incoming audio streams corresponding to the communications sessions 34C, 34E, 34I, and 34M at the aural position corresponding to the position of the participant icon 50I-2 which is closest to the positioning line 52B, such that each of the participants 16C, 16E, 16I, and 16M sound as if they are at the same position to the participant 16J. Alternately, the user interface 28 may allow the participant 16J to hear each of the participants 16C, 16E, 16I, and 16M at different aural positions that correspond to the respective positions of the participant icons 50C-2, 50E-2, 50I-2, and 50M-2.

Various aspects of the present invention may be embodied in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a media server 12, or a communication device 14, for example.

Those skilled in the art will recognize improvements and modifications to the preferred embodiments of the present invention. All such improvements and modifications are considered within the scope of the concepts disclosed herein and the claims that follow.

What is claimed is:

1. A method for designating an aural position of an audio stream in a collaboration environment, comprising:
    displaying in a first display area of a user interface on a display device a plurality of participant icons;
    receiving a first outgoing audio stream corresponding to a first participant icon of the plurality of participant icons, wherein the first outgoing audio stream includes aural position characteristics that aurally position the first outgoing audio stream at a first aural position corresponding to a first position of the first participant icon in the first display area;
    receiving first input indicating the first participant icon has been moved from the first position to a second position in the first display area;
    in response to the first input, determining a second aural position of the first participant icon corresponding to the second position based on the second position and a reference position;
    sending a control signal to a conference processor including an audio stream identifier identifying the first outgoing audio stream and an aural position identifier identifying the second aural position; and
    receiving the first outgoing audio stream wherein the first outgoing audio stream includes aural position characteristics that aurally position the first outgoing audio stream at the second aural position.

2. The method of claim 1, wherein the plurality of participant icons comprises at least four participant icons, and wherein the first participant icon corresponds to a first participant communication session, a second participant icon corresponds to a second participant communication session; a third participant icon corresponds to a third participant communication session, and a fourth participant icon corresponds to a fourth participant communication session, further comprising:
    receiving second input requesting a subgroup comprising the first participant icon and the second participant icon; and
    in response to the second input, sending a mixing control signal to the conference processor, wherein the mixing control signal directs the conference processor to:
        provide an incoming audio stream associated with the first participant to the second participant communication session, and not to the third participant communication session or to the fourth participant communication session; and
        provide an incoming audio stream associated with the second participant to the first participant communication session, and not to the third participant communication session or to the fourth participant communication session.

3. The method of claim 2, further comprising displaying the first participant icon and the second participant icon in a second display area of the user interface.

4. The method of claim 2 further comprising:
    receiving third input indicating a selection of the subgroup; and
    in response to the third input, sending a second mixing control signal to the conference processor, wherein the second mixing control signal directs the conference processor to provide an incoming audio stream associated with a moderator to the first participant communication session and the second participant communication session, and not to the third participant communication session or to the fourth participant communication session.

5. The method of claim 4 further comprising:
receiving fourth input indicating a selection of all the plurality of participant icons; and
in response to the fourth input, sending a third mixing control signal to the conference processor, wherein the third mixing control signal directs the conference processor to provide the incoming audio stream associated with the moderator to the first participant communication session, the second participant communication session, the third participant communication session, and the fourth participant communication session.

6. The method of claim 3 where within the plurality of participant icons, a first of the plurality of participant icons being displayed in the first display area, and a second of the plurality of participant icons being concurrently displayed in the second display area, the method further comprising:
receiving second input indicating the first participant icon in the second display area has been moved from a first position in the second display area to a second position in the second display area; and
in response to the second input, determining a new aural position of the first participant icon in the second display area corresponding to the second position based on the second position and a second reference position, wherein the new aural position is different from the second aural position.

7. The method of claim 2 further comprising:
receiving third input requesting a second subgroup comprising the third participant icon and the fourth participant icon; and
sending the mixing control signal to the conference processor, wherein the mixing control signal directs the conference processor to:
provide an incoming audio stream associated with the third participant to the fourth participant communication session, and not to the first participant communication session or to the second participant communication session; and
provide an incoming audio stream associated with the fourth participant to the third participant communication session, and not to the first participant communication session or to the second participant communication session.

8. The method of claim 7 further comprising:
receiving fourth input indicating authorization of the first subgroup to initiate communications with the second subgroup, and in response to the fourth input, sending an authorization indicator to a server, receiving data indicating the first subgroup has initiated communications with the second subgroup, and updating the user interface to indicate the first subgroup has initiated communications with the second subgroup.

9. The method of claim 8 wherein the authorization indicator is sent to a media server comprising the conference processor.

10. A media server comprising:
a communication interface adapted to communicate with a moderator communication session, a first participant communication session, and a second participant communication session; and
a conference processor, wherein the conference processor is adapted to:
receive first aural position data associated with the first participant communication session and second aural position data associated with the second participant communication session from a moderator;
receive a first incoming audio stream from the first participant communication session and a second incoming audio stream from the second participant communication session;
generate a first outgoing audio stream based on the first incoming audio stream and the second incoming audio stream, wherein the first outgoing audio stream aurally positions the first incoming audio stream at an aural position indicated by the first aural position data and the second incoming audio stream at an aural position indicated by the second aural position data; and
provide the first outgoing audio stream to the moderator communication session.

11. The media server of claim 10 wherein the communication interface is further adapted to communicate with a third participant communication session and a fourth participant communication session, and wherein the conference processor is further adapted to:
receive a first mixing control signal, and based on the first mixing control signal provide a second outgoing audio stream based on the first incoming audio stream to the second participant communication session, and not to the third participant communication session or the fourth participant communication session, and a third outgoing audio stream based on the second incoming audio stream to the first participant communication session, and not to the third participant communication session or the fourth participant communication session.

12. The media server of claim 11 wherein the conference processor is further adapted to:
receive third aural position data associated with the first participant communication session from a second participant corresponding to the second communication session,
receive the first incoming audio stream from the first communication session,
generate a fourth outgoing audio stream aurally positioning the fourth outgoing audio stream at an aural position indicated by the third aural position data, and
provide the fourth outgoing audio stream to the second communication session.

13. The media server of claim 12 wherein the third aural position data is different from the first aural position data, and wherein the first outgoing audio stream and the fourth outgoing audio stream are generated substantially simultaneously, and wherein the first outgoing audio stream is provided to the moderator communication session concurrently with providing the fourth outgoing audio stream to the second communication session.

14. The media server of claim 11 wherein the conference processor is further adapted to:
receive a second mixing control signal, and based on the second mixing control signal provide a moderator outgoing audio stream to the first participant communication session and the second participant communication session, and not to the third participant communication session or the fourth participant communication session.

15. The media server of claim 14 wherein the conference processor is further adapted to:
receive a third mixing control signal, and based on the third mixing control signal provide the moderator outgoing audio stream to the first participant communication session, the second participant communication session, the third participant communication session and the fourth participant communication session.

16. The media server of claim 11 wherein the conference process is further adapted to:
- receive third aural position data identifying an aural position associated with the third participant communication session and the fourth participant communication session;
- provide a second outgoing audio stream at an aural position indicated by the third aural position data based on a third incoming audio stream from the third participant communication session and a fourth incoming audio stream from the fourth participant communication session.

17. The media server of claim 10, wherein the conference processor is further adapted to receive a first mixing control signal, and based on the first mixing control signal provide a moderator incoming audio stream from the moderator communication session to the first participant communication session and not to the second participant communication session, and the first incoming audio stream to the moderator communication session and not to the second participant communication session.

18. A computer program product, comprising a non-transitory computer usable medium having a computer readable program code embodied therein, said computer readable program code adapted to be executed to implement a method for designating an aural position of an audio stream, said method comprising:
- displaying, in a first display area of a user interface on a display device, a plurality of participant icons;
- receiving a first outgoing audio stream corresponding to a first participant icon of the plurality of participant icons, wherein the first outgoing audio stream includes aural position characteristics that aurally position the first outgoing audio stream at a first aural position corresponding to a first position of the first participant icon in the first display area;
- receiving first input indicating that the first participant icon has been moved from the first position to a second position in the first display area;
- in response to the first input, determining a second aural position of the first participant icon corresponding to the second position based on the second position and a reference position;
- sending a control signal to a conference processor including an audio stream identifier identifying the first outgoing audio stream and an aural position identifier identifying the second aural position; and
- receiving the first outgoing audio stream wherein the first outgoing audio stream includes aural position characteristics that aurally position the first outgoing audio stream at the second aural position.

19. The computer program product of claim 18 wherein the plurality of participant icons comprises at least four participant icons, and wherein the first participant icon corresponds to a first participant communication session, a second participant icon corresponds to a second participant communication session; a third participant icon corresponds to a third participant communication session, and a fourth participant icon corresponds to a fourth participant communication session, the method further comprising:
- receiving second input requesting a subgroup comprising the first participant icon and the second participant icon; and
- in response to the second input, sending a mixing control signal to the conference processor, wherein the mixing control signal directs a conference processor to:
  - provide an incoming audio stream associated with a first participant to the second participant communication session, and not to the third participant communication session or to the fourth participant communication session; and
  - provide an incoming audio stream associated with a second participant to the first participant communication session, and not to the third participant communication session or to the fourth participant communication session.

20. The computer program product of claim 19, further comprising displaying the first participant icon and the second participant icon in a second display area of the user interface.

21. The computer program product of claim 19, wherein the method further comprises:
- receiving third input indicating a selection of the subgroup; and
- in response to the third input, sending a second mixing control signal to the conference processor, wherein the second mixing control signal directs the conference processor to provide an incoming audio stream associated with the moderator to the first participant communication session and the second participant communication session, and not to the third participant communication session or to the fourth participant communication session.

22. A computer-implemented method of controlling a collaboration environment, comprising:
- displaying in a first display area of a user interface on a computer, a first participant icon and a second participant icon, wherein the first participant icon is associated with a first communication session and the second participant icon is associated with a second communication session;
- receiving a first outgoing audio stream corresponding to the first participant icon, wherein the first outgoing audio stream includes aural position characteristics that aurally position the first outgoing audio stream at a first aural position corresponding to a first position in the first display area;
- detecting movement of the first participant icon from the first display area to a location in a second display area;
- determining aural position data associated with the location with respect to a reference location;
- providing the aural position data to a conference processor;
- receiving an audio stream aurally positioning a first participant audio stream corresponding to the first communication session at an aural position identified by the aural position data; and
- providing the audio stream to an output device.

* * * * *